(12) United States Patent
Sato et al.

(10) Patent No.: US 8,576,512 B1
(45) Date of Patent: Nov. 5, 2013

(54) SPINDLE MOTOR AND DISK DRIVE APPARATUS

(71) Applicant: Nidec Corporation, Kyoto (JP)

(72) Inventors: Kazuhiro Sato, Kyoto (JP); Masahiro Shiraishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/798,827

(22) Filed: Mar. 13, 2013

(51) Int. Cl.
*G11B 17/02* (2006.01)

(52) U.S. Cl.
USPC .......................................... 360/99.08

(58) Field of Classification Search
USPC ......................................... 360/99.08
See application file for complete search history.

(56) References Cited

U.S. PATENT DOCUMENTS

| | | | | |
|---|---|---|---|---|
| 5,572,384 | A * | 11/1996 | Kumagai et al. | 360/99.08 |
| 6,445,535 | B1 * | 9/2002 | Rehm | 360/99.08 |
| 7,012,191 | B1 | 3/2006 | Watanabe et al. | |
| 8,120,872 | B2 * | 2/2012 | Sekii et al. | 360/99.08 |
| 8,324,771 | B2 * | 12/2012 | Yawata et al. | 310/71 |
| 8,363,352 | B2 | 1/2013 | Kang | |
| 8,363,353 | B2 * | 1/2013 | Yawata | 360/99.08 |
| 2005/0286167 | A1 * | 12/2005 | Yonei et al. | 360/99.08 |
| 2006/0138886 | A1 | 6/2006 | Ito et al. | |
| 2006/0265871 | A1 | 11/2006 | Ito et al. | |
| 2007/0247010 | A1 | 10/2007 | Ichizaki | |
| 2007/0278880 | A1 | 12/2007 | Wada et al. | |
| 2008/0019038 | A1 | 1/2008 | Xu et al. | |
| 2008/0084142 | A1 | 4/2008 | Ino et al. | |
| 2010/0177627 | A1 | 7/2010 | Ino et al. | |
| 2011/0122530 | A1 * | 5/2011 | Sekii et al. | 360/99.08 |
| 2012/0200957 | A1 | 8/2012 | Yawata | |

FOREIGN PATENT DOCUMENTS

| | | |
|---|---|---|
| JP | 05-207717 A | 8/1993 |
| JP | 05-070184 U | 9/1993 |
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Mark Blouin
(74) *Attorney, Agent, or Firm* — Keating & Bennett, LLP

(57) ABSTRACT

A base member includes a base groove portion, a base through-hole, and an insulating sheet portion. The base groove portion is positioned on a lower surface of the base member. The base through-hole extends through the base member. The first insulating sheet portion is arranged on a bottom surface of the base groove portion. A lead wire extended from a coil is led out into the base groove portion through the base through-hole and is connected to a land portion. The base through-hole has a diameter which is different depending on the direction in which it extends. The base through-hole includes a major and minor axis extending in a direction where the diameter is largest and smallest respectively. A portion of an edge of the first insulating sheet portion on the lower surface of the base member intersects the major axis and covers a portion of the base through-hole.

15 Claims, 8 Drawing Sheets

(56) References Cited

FOREIGN PATENT DOCUMENTS

| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.
Saeki et al.,"Base Unit", U.S. Appl. No. 13/770,374, filed Feb. 19, 2013.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Masumi et al., "Base Plate, Base Unit, Motor, Disk Drive Apparatus and Method of Manufacturing the Base Plate", U.S. Appl. No. 13/789,974, filed Mar. 8, 2013.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al.,"Spindle Motor and Disk Drive Apparatus", U.S. Appl. No. 13/798,842, filed Mar. 13, 2013.
Tamaoka et al., "Motor and Disk Drive Apparatus", U.S. Appl. No. 13/564,900, filed Aug. 2, 2012.
Ishino et al., "Motor and Disk Drive Apparatus", U.S. Appl. No. 13/794,864, filed Mar. 12, 2013.

\* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A hard disk device or an optical disk device is equipped with a spindle motor for rotating a disk. The spindle motor includes a stationary unit fixed to a housing of a device and a rotary unit rotating together with a disk supported thereon. In the spindle motor, torque acting about a center axis is generated by magnetic flux generated between the stationary unit and the rotary unit, whereby the rotary unit is rotated with respect to the stationary unit.

A conventional spindle motor is disclosed in, e.g., Japanese Patent Application Publication No. 2011-114892. The spindle motor of Japanese Patent Application Publication No. 2011-114892 includes a base member, coils, and a circuit substrate. Lead wires extending from the coils are led out via through-holes of the base member and are connected to the circuit substrate.

In this spindle motor, there is a need to electrically insulate the lead wires led out from the coils from the base member. Particularly, the spindle motor is becoming thinner and thinner in recent years. Consequently, the diameter of the lead wires making up the coils tends to become smaller. If the diameter of the lead wires becomes smaller, the protection film covering each of the lead wires grows thinner. For that reason, if the lead wires having a small diameter contact the base member, there is a fear that the lead wires may be damaged by even light contact. Thus, it is desirable to prevent the lead wires and the base member from contacting each other even under a tension state.

As the spindle motor becomes thinner, the base member also becomes thinner such that the rigidity of the base member is decreased. In order to maintain the rigidity of the base member, there is a need to reduce the size of a base through-hole. Accordingly, it is preferred that the base through-hole be shaped to easily lead out the lead wires therethrough.

SUMMARY OF THE INVENTION

A spindle motor according to one illustrative preferred embodiment of the present invention includes a stationary unit and a rotary unit supported to rotate about a center axis extending in an up-and-down direction. The stationary unit includes a base member, an armature and a circuit substrate. The base member is preferably made of metal. The armature is positioned above the base member. The circuit substrate is arranged on a lower surface of the base member and is electrically connected to a coil of the armature. The rotary unit includes a magnet arranged in an opposing relationship with the armature. The base member includes a base groove portion, at least one base through-hole and a first insulating sheet portion. The base groove portion is positioned on the lower surface of the base member. The base through-hole extends through the base member from the upper surface of the base member toward the lower surface thereof. The first insulating sheet portion is arranged on a bottom surface of the base groove portion. A lead wire extends from the coil. The lead wire is led out into the base groove portion through the base through-hole and is soldered to a land portion of the circuit substrate. The base through-hole has a diameter which becomes different depending on the direction in which it extends. The base through-hole includes a major axis extending in a direction in which the diameter of the base through-hole becomes largest and a minor axis extending in a direction in which the diameter of the base through-hole becomes smallest. A portion of an edge of the first insulating sheet portion is arranged on the lower surface of the base member to intersect the major axis of the base through-hole and to cover a portion of the base through-hole.

According to the preferred embodiments of the present invention, the lead wire and the base member are prevented from contacting each other. Moreover, the base through-hole can be shaped so as to easily lead out the lead wire therethrough.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the direction parallel or substantially parallel to the center axis of a spindle motor will be referred to as "axial". The direction orthogonal or substantially orthogonal to the center axis of the spindle motor will be referred to as "radial". The direction extending along an arc about the center axis of the spindle motor will be referred to as "circumferential". The direction approaching the center axis of the spindle motor will be referred to as "inward". The direction going away from the center axis of the spindle motor will be referred to as "outward". In the following description, the shape and positional relationship of individual components will be described under the assumption that the axial direction is an up-and-down direction and further that the side of an armature with respect to a base member is an upper side. However, such definition of the respective directions is not intended to limit the in-use direction of the spindle motor and the disk drive apparatus according to the present invention.

The term "parallel" referred to in the following description includes not only a strictly parallel direction in terms of mathematics but also a visually identical direction which corresponds to a substantially parallel direction. The term "orthogonal" referred to in the subject application includes not only a strictly orthogonal direction in terms of mathematics but also a visually orthogonal direction which corresponds to a substantially orthogonal direction.

Figure 1:
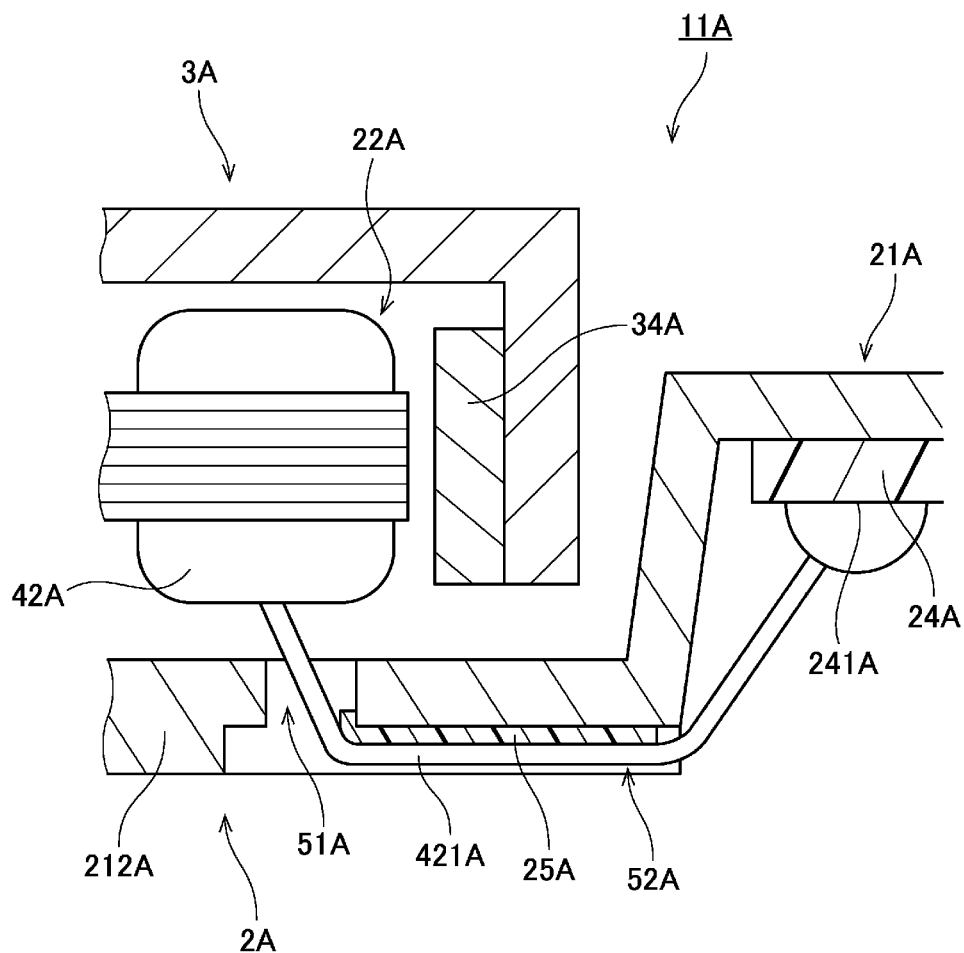
FIG. 1 is a partial vertical sectional view of a spindle motor according to a first preferred embodiment of the present invention.

FIG. 1 is a partial sectional view of a spindle motor 11A according to a first illustrative preferred embodiment of the present invention. As shown in FIG. 1, the spindle motor 11A preferably includes a stationary unit 2A and a rotary unit 3A.

The stationary unit 2A preferably includes a base member 21A, an armature 22A, and a circuit substrate 24A. The base member 21A is preferably made of metal. The base member 21A may be made of, e.g., aluminum alloy, ferromagnetic or non-magnetic stainless steel, magnesium alloy, etc. The armature 22A is positioned above the base member 21A. The circuit substrate 24A is arranged on the lower surface of the base member 21A. The circuit substrate 24A is electrically connected to the coils 42A of the armature 22A. That is to say, the circuit substrate 24A preferably stays electrically connected to the coils 42A of the armature 22A.

The rotary unit 3A is supported to rotate about a center axis extending in an up-and-down direction. The rotary unit 3A preferably includes a magnet 34A. The magnet 34A is arranged in an opposing relationship with the armature 22A of the stationary unit 2A. During the operation of the spindle motor 11A, torque is generated by the magnetic flux generated between the armature 22A and the magnet 34A.

As shown in FIG. 1, the base member 21A preferably includes a base through-hole 51A, a base groove portion 52A, and a first insulating sheet portion 25A. The base through-hole 51A axially extends through the base member 21A. The base groove portion 52A is arranged on the lower surface of the base member 21A. The first insulating sheet portion 25A is preferably arranged within the base groove portion 52A and is fixed by, for example, an adhesive agent, a sticky material, etc.

The base through-hole 51A has a diameter which becomes different depending on the direction in which it extends. The base through-hole includes a major axis extending in a direction in which the diameter of the base through-hole 51A becomes largest. A portion of an edge of the first insulating sheet portion 25A is arranged on the lower surface of the base member 21A to intersect the major axis of the base through-hole 51A and to cover a portion of the base through-hole 51A. In other words, a portion of a radial inner region of the first insulating sheet portion 25A is arranged on the lower surface of the base member 21A to intersect the major axis of the base through-hole 51A and to cover a portion of the base through-hole 51A.

A lead wire 421A extending from each of the coils 42A is led out into the base groove portion 52A via the base through-hole 51A. Moreover, the lead wire 421A extends radially outward along the lower surface of the first insulating sheet portion 25A. The lead wire 421A is soldered to the land portion 241A of the circuit substrate 24A at the radial outer side of the bottom portion 212A. For that reason, the contact between the lead wire 421A and the base member 21A is prevented by the first insulating sheet portion 25A. Accordingly, it is possible to prevent the lead wire 421A and the base member 21A from being short-circuited.

Figure 2:
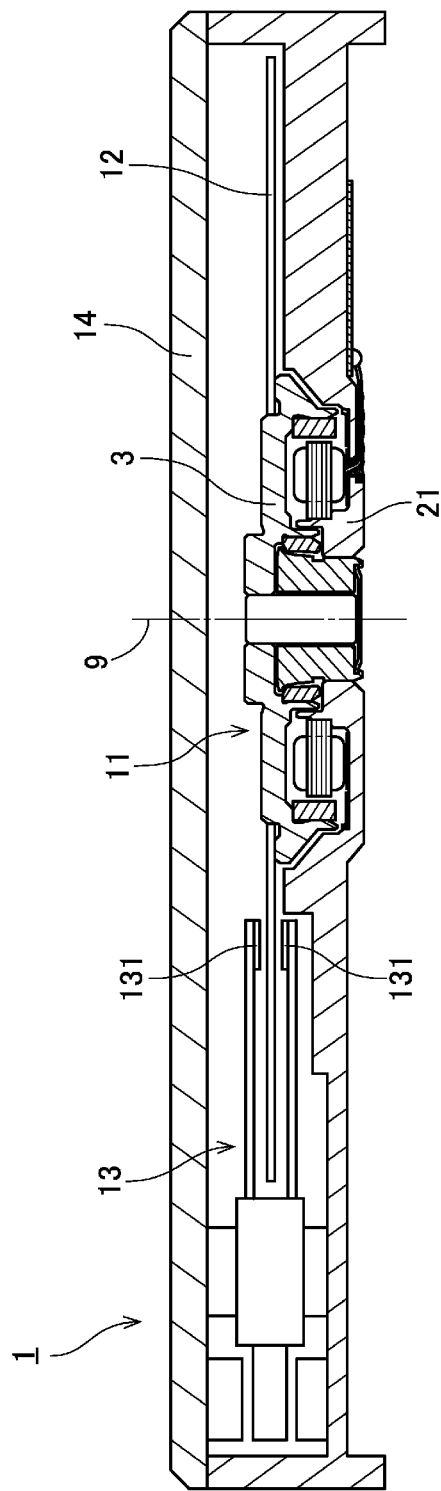
FIG. 2 is a vertical sectional view of a disk drive apparatus according to a second preferred embodiment of the present invention.

FIG. 2 is a vertical sectional view of a disk drive apparatus 1 according to a second preferred embodiment of the present invention. The disk drive apparatus 1 is an apparatus arranged to rotate, e.g., a magnetic disk 12, and to perform information reading and writing tasks with respect to the magnetic disk 12. As shown in FIG. 2, the disk drive apparatus 1 preferably includes a spindle motor 11, a magnetic disk 12, an access unit 13, and a cover 14.

The spindle motor 11 supports the magnetic disk 12 and rotates the magnetic disk 12 about a center axis 9. The spindle motor 11 preferably includes a base member 21 (see FIG. 3) extending in a direction orthogonal to the center axis 9. The upper region of the base member 21 is preferably covered with the cover 14. The rotary unit 3 of the spindle motor 11, the magnetic disk 12, and the access unit 13 are accommodated within a housing defined by the base member 21 and the cover 14. The access unit 13 is arranged to displace a head 131 along the recording surface of the magnetic disk 12 and to perform information reading and writing tasks with respect to the magnetic disk 12.

The disk drive apparatus 1 may include two or more magnetic disks 12, for example. Furthermore, the access unit 13 may perform only one of the information reading and writing tasks with respect to the magnetic disk 12.

Figure 3:
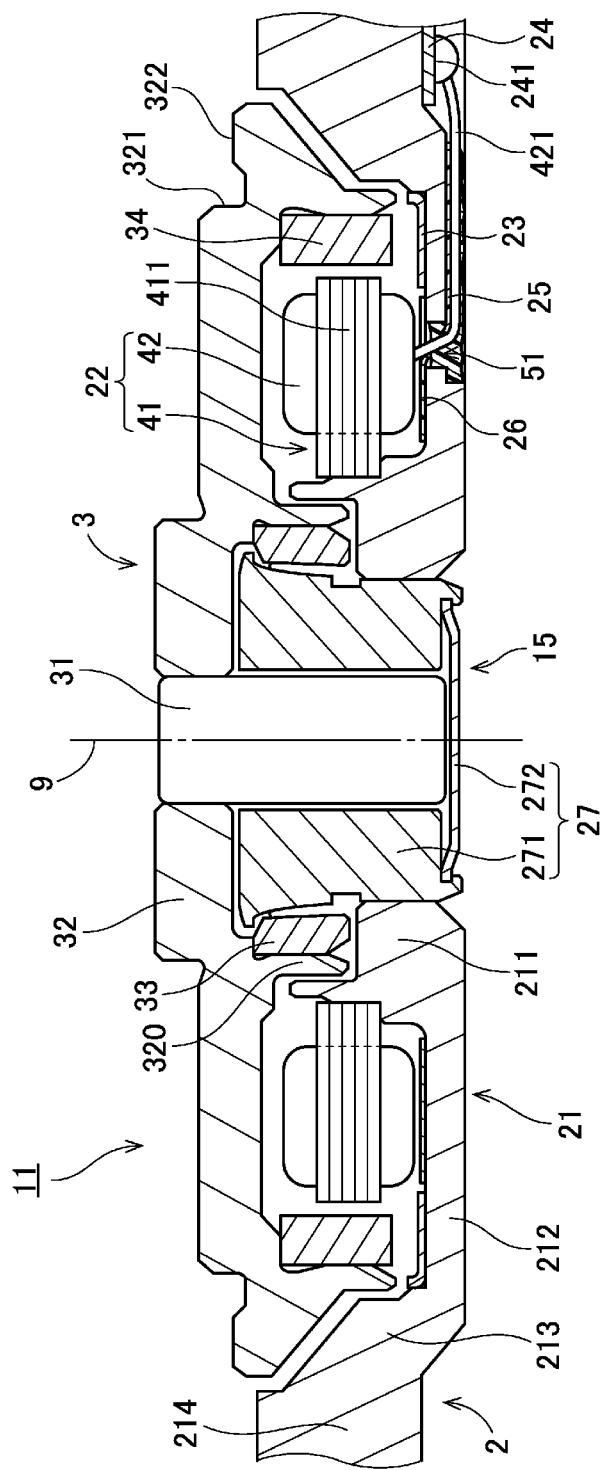
FIG. 3 is a vertical sectional view of a spindle motor according to the second preferred embodiment of the present invention.

Next, description will be made on the detailed configuration of the spindle motor 11. FIG. 3 is a vertical sectional view of the illustrative spindle motor 11 according to a preferred embodiment of the present invention. As shown in FIG. 3, the spindle motor 11 preferably includes a stationary unit 2 and a rotary unit 3. The stationary unit 2 is kept stationary with respect to the base member 21 and the cover 14. The rotary unit 3 is supported to rotate with respect to the stationary unit 2.

The stationary unit 2 of the present preferred embodiment preferably includes a base member 21, an armature 22, a magnetic member 23, a circuit substrate 24, a first insulating sheet portion 25, a second insulating sheet portion 26, and a stationary bearing unit 27.

The base member 21 is arranged below the rotary unit 3, the magnetic disk 12 and the access unit 13 to extend in the direction orthogonal to the center axis 9. The base member 21 is preferably obtained by, for example, forging a metal member. The base member 21 may be made of a metallic material, e.g., aluminum alloy, ferromagnetic or non-magnetic stainless steel, magnesium alloy, etc. Alternatively, the base member 21 may be obtained by other methods such as, for example, cutting, pressing, etc. In addition, the base member 21 may be defined by a plurality of separate members, if so desired.

The base member 21 preferably includes a cylinder portion 211, an inner bottom portion 212, an annular wall portion 213, and an outer bottom portion 214. The inner bottom portion 212 is arranged below the armature 22 to extend in a ring shape. Moreover, the inner bottom portion 212 is positioned axially below the outer bottom portion 214. The cylinder portion 211 extends upward in a cylindrical or substantially cylindrical shape from the radial inner edge portion of the inner bottom portion 212. The annular wall portion 213 extends radially outward and upward from the radial outer edge portion of the inner bottom portion 212. The outer bottom portion 214 extends further radially outward from the radial outer edge portion of the annular wall portion 213.

The armature 22, the magnetic member 23, the second insulating sheet portion 26, and a portion of the rotary unit 3 are preferably accommodated at the upper side of the inner bottom portion 212 and at the radial inner side of the annular wall portion 213. Thus, the outer bottom portion 214 is arranged at or substantially at the same height as the armature 22 and a portion of the rotary unit 3.

The armature 22 preferably includes a stator core 41 and a plurality of coils 42. The stator core 41 and the coils 42 are positioned above the inner bottom portion 212. The stator core 41 is preferably defined by a steel plate laminate obtained by axially stacking electromagnetic steel plates, e.g., silicon steel plates, one above another. The stator core 41 is fixed to the outer circumferential surface of the cylinder portion 211. Moreover, the stator core 41 preferably includes a plurality of teeth 411 protruding radially outward. The teeth 411 are preferably arranged at a regular or substantially regular interval in the circumferential direction.

The coils 42 are preferably defined by lead wires wound around the respective teeth 411. More specifically, the coils 42 are preferably defined by three lead wires 421 arranged to supply three-phase electrical currents therethrough. The end portions of the respective lead wires 421 are led out toward the lower surface of the base member 21 via the three base through-holes 51, respectively.

The magnetic member 23 is preferably an annular member arranged on the upper surface of the inner bottom portion 212. The magnetic member 23 is preferably defined by a magnetic material, e.g., an electromagnetic steel plate (e.g., a silicon steel plate), a ferromagnetic stainless steel plate (e.g., SUS430), a cold-rolled steel plate (e.g., SPCC or SPCE), or other suitable material, for example. The magnetic member 23 is positioned below the magnet 34 to be described later. A magnetic attraction force is generated between the magnetic member 23 and the magnet 34. Thus, the rotary unit 3 is attracted toward the stationary unit 2.

The circuit substrate 24 is arranged on the lower surface of the base member 21. Three land portions 241 including exposed copper foils are preferably arranged on the lower surface of the circuit substrate 24. The three lead wires 421 led out from the base through-holes 51 are respectively soldered to the three land portions 241. Thus, the circuit substrate 24 and the coils 42 are electrically connected to each other. The term "electrically connected" referred to herein means that the circuit substrate 24 and the coils 42 stay in an electrically conductive state. Accordingly, an electric current used in driving the spindle motor 11 is supplied from an external power source to the coils 42 through the circuit substrate 24.

The number of the lead wires 421 led out from the base through-hole 51 is not limited to three but may alternatively be more than or less than three if so desired. For example, four lead wires may be led out from the base through-hole 51. Moreover, the number of the base through-hole 51 is not limited to one but may be two or more if so desired. Also, a single lead wire or a plurality of lead wires may be led out from a single base through-hole.

A flexible printed substrate having flexibility is preferably used as the circuit substrate 24 of the present preferred embodiment. Use of the flexible printed substrate makes it possible to arrange the circuit substrate 24 along the irregularities of the lower surface of the base member 21. Use of the flexible printed substrate also makes it possible to reduce the axial thickness of the circuit substrate 24 as compared with other substrates. Accordingly, it is possible to further reduce the axial thickness of the spindle motor 11.

The stationary bearing unit 27 preferably includes a sleeve 271 and a cap 272. The sleeve 271 is arranged around the below-mentioned shaft 31 to axially extend in a cylindrical or substantially cylindrical shape. The lower portion of the sleeve 271 is arranged radially inward of the cylinder portion 211 of the base member 21 and is fixed to the cylinder portion 211 preferably by, e.g., an adhesive agent. The inner circumferential surface of the sleeve 271 is radially opposed to the outer circumferential surface of the shaft 31. The cap 272 preferably closes the lower opening of the sleeve 271. The sleeve 271 may be defined by a plurality of members.

The rotary unit 3 preferably includes a shaft 31, a hub 32, an annular member 33, and a magnet 34.

The shaft 31 is arranged radially inward of the sleeve 271 to extend in the axial direction. The shaft 31 is preferably made of metal, e.g., ferromagnetic or non-magnetic stainless steel. The upper end portion of the shaft 31 protrudes more upward than the upper surface of the sleeve 271.

The hub 32 extends radially outward from the peripheral edge of the upper end portion of the shaft 31. The inner circumferential portion of the hub 32 is fixed to the upper end portion of the shaft 31. As shown in FIG. 3, the hub 32 preferably includes an annular projection 320 protruding downward. The annular member 33 is fixed to the inner circumferential surface of the annular projection 320. The inner circumferential surface of the annular member 33 is radially opposed to the outer circumferential surface of the sleeve 271.

The hub 32 preferably includes a first holding surface 321 having a cylindrical or substantially cylindrical shape and a second holding surface 322 extending radially outward from the lower end portion of the first holding surface 321. The inner circumferential portion of the magnetic disk 12 contacts at least a portion of the first holding surface 321. Furthermore, the lower surface of the magnetic disk 12 contacts at least a portion of the second holding surface 322. Thus, the magnetic disk 12 is held in place.

A lubricant is preferably provided between the shaft 31 and the stationary bearing unit 27, between the hub 32 and the stationary bearing unit 27, and between the annular member 33 and the stationary bearing unit 27. The liquid level of the lubricant is preferably positioned between the sleeve 271 and the annular member 33. For example, polyol ester-based oil or diester-based oil is preferably used as the lubricant. The shaft 31 is rotatably supported with respect to the stationary bearing unit 27 through the lubricant.

That is to say, in the present preferred embodiment, a bearing mechanism 15 is defined by: the sleeve 271 and the cap 272, which are members belonging to the stationary unit 2; the shaft 31, the hub 32, and the annular member 33, which are members belonging to the rotary unit 3; and the lubricant existing between these members. The bearing mechanism 15 is accommodated within the cylinder portion 211. The rotary unit 3 is supported on the bearing mechanism 15 and is rotated about the center axis 9.

The magnet 34 is arranged radially outward of the armature 22 and is fixed to the hub 32. The magnet 34 of the present preferred embodiment is preferably has an annular shape. The inner circumferential surface of the magnet 34 is radially opposed to the radial outer end surfaces of the teeth 411. The inner circumferential surface of the magnet 34 is alternately magnetized with N-poles and S-poles along the circumferential direction.

A plurality of magnets may alternatively be used in place of the annular magnet 34 if so desired. In case of using a plurality of magnets, the plurality of magnets may be arranged along the circumferential direction so that N-poles and S-poles can be alternately lined up.

In the spindle motor 11 described above, if an electrical drive current is supplied to the coils 42 via the circuit substrate 24, magnetic flux is generated in the teeth 411. Then, circumferential torque is generated by the interaction of the magnetic flux between the teeth 411 and the magnet 34. As a result, the rotary unit 3 is rotated about the center axis 9 with respect to the stationary unit 2. The magnetic disk 12 supported on the hub 32 is rotated about the center axis 9 together with the rotary unit 3.

Next, description will be made on the routes of the lead wires 421 extending from the coils 42 to the land portions

Figure 4:
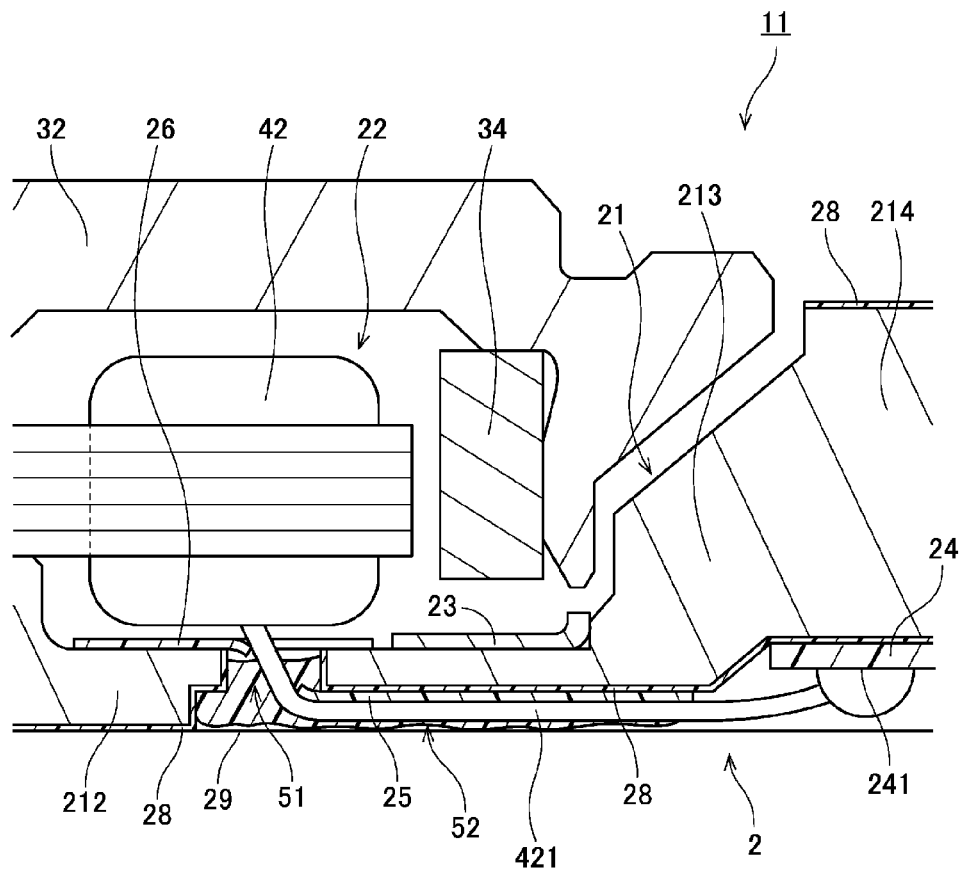
FIG. 4 is a partial vertical sectional view of the spindle motor according to the second preferred embodiment of the present invention.
Figure 5:
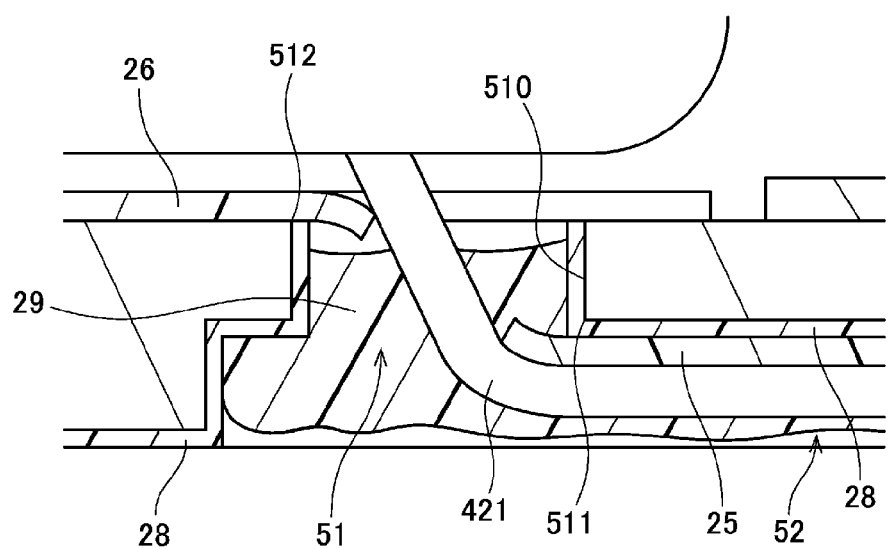
FIG. 5 is a partial vertical sectional view of a stationary unit according to the second preferred embodiment of the present invention.
Figure 6:
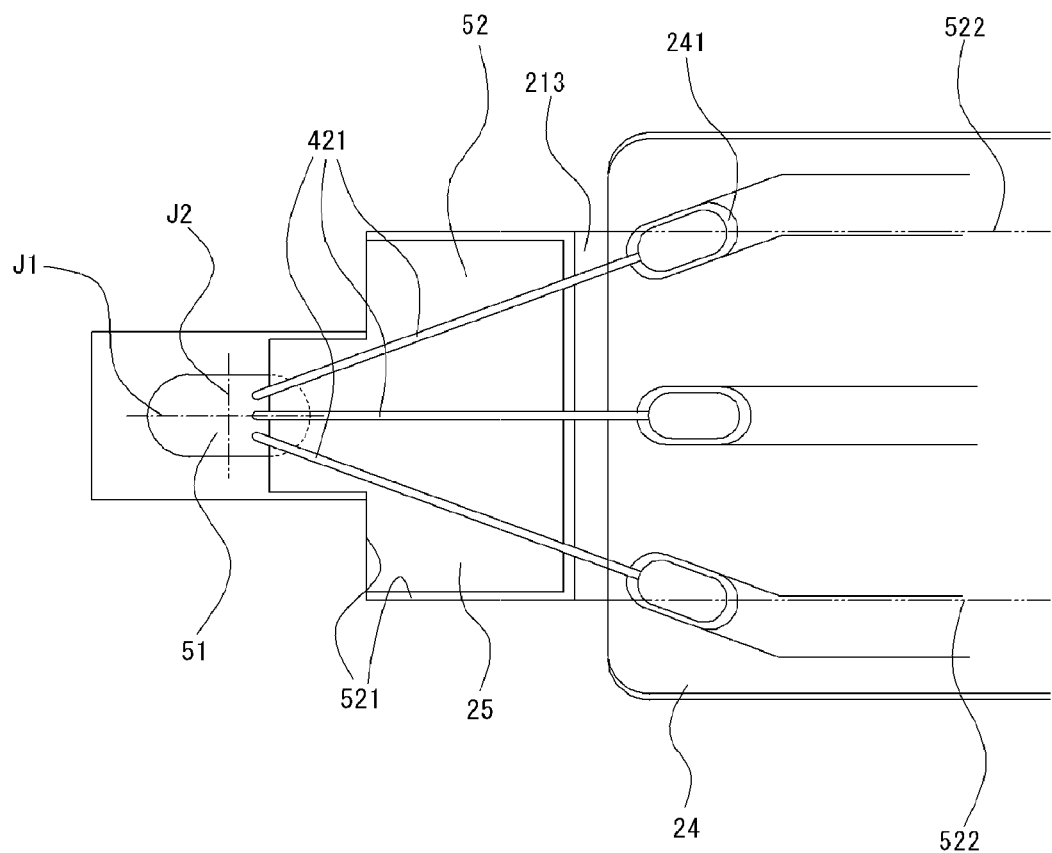
FIG. 6 is a partial bottom view of a base member according to the second preferred embodiment of the present invention.

241. FIG. 4 is a partial sectional view of the spindle motor 11 according to a preferred embodiment of the present invention, which includes each of the routes of the lead wires 421 extending from the coils 42 to the land portions 241. FIG. 5 is a vertical sectional view showing a portion of each of the routes of the lead wires 421 on an enlarged scale. FIG. 6 is a partial bottom view of the base member 21, which includes the routes of the lead wires 421. In FIG. 6, an adhesive agent 29 is omitted from illustration for clarification purposes. In the following description, reference will be made to FIG. 3 and, if appropriate, FIGS. 4 through 6.

As shown in FIGS. 4 and 5, at least a portion of the surface of the base member 21 is covered with an insulating portion 28. The insulating portion 28 is preferably defined by electrophoretically coating, e.g., a resin as an electrically insulating material. Alternatively, the insulating portion 28 may be provided by a powder coating if so desired. In the present preferred embodiment, as shown in FIG. 4, at least the lower surface of the inner bottom portion 212, the lower surface of the annular wall portion 213, the lower surface of the outer bottom portion 214, and the upper surface of the outer bottom portion 214 are covered with the insulating portion 28.

The base member 21 preferably includes a base through-hole 51 and a base groove portion 52. The base through-hole 51 extends through the base member 21 from the upper surface of the base member 21 toward the lower surface thereof. More specifically, the base through-hole 51 of the present preferred embodiment axially extends through the base member 21. Preferably, the base through-hole 51 is positioned below the armature 22. As shown in FIG. 5, a tubular surface 510 of the base member 21 defining the base through-hole 51 is preferably covered with the insulating portion 28. Furthermore, a base groove portion 52 is preferably defined on the lower surface of the base member 21. As shown in FIG. 4, the base groove portion extends from the base through-hole 51 toward the circuit substrate 24. In other words, the base through-hole 51 is opened into the base groove portion 52. The bottom surface and the wall surfaces defining the base groove portion 52 are preferably covered with the insulating portion 28. The base through-hole 51 may radially extend through the base member 21.

A first insulating sheet portion 25 is preferably arranged within the base groove portion 52. The first insulating sheet portion 25 is preferably fixed to the bottom surface of the base groove portion 52 by, for example, an adhesive agent, a sticky material, etc. In addition, a second insulating sheet portion 26 is preferably arranged on the upper surface of the inner bottom portion 212. The second insulating sheet portion 26 is preferably fixed to the upper surface of the inner bottom portion 212 by, for example, an adhesive agent, a sticky material, etc.

The first insulating sheet portion 25 and the second insulating sheet portion 26 are preferably made of an electrically insulating material, e.g., a resin such as polyethylene terephthlate (PET) or the like. The thickness of the first insulating sheet portion 25 and the thickness of the second insulating sheet portion 26 are both preferably larger than the thickness of the insulating portion 28 and smaller than the thickness of the circuit substrate 24 in the land portions 241. At least a portion of the surface of the base member 21 may be covered with a metal plating layer. In this case, the thickness of the first insulating sheet portion 25 is preferably larger than the thickness of the metal plating layer.

The second insulating sheet portion 26 is preferably interposed between the inner bottom portion 212 and the coils 42. This prevents the base member 21 and the coils 42 from contacting each other. Thus, the base member 21 and the coils 42 are electrically insulated from each other. The interposition of the second insulating sheet portion 26 between the inner bottom portion 212 and the coils 42 makes it possible to bring the inner bottom portion 212 and the coils 42 into close proximity with each other in the axial direction. This arrangement further reduces the axial thickness of the spindle motor 11.

As shown in FIGS. 4 and 5, each of the lead wires 421 extends toward the base through-hole 51 from the upper side of the inner bottom portion 212 and from the radial inner side of the center of the base through-hole 51. Moreover, each of the lead wires 421 is led out into the base groove portion 52 via the base through-hole 51. Within the base groove portion 52, each of the lead wires 421 extends radially outward along the lower surface of the first insulating sheet portion 25. The end portion of each of the lead wires 421 is soldered to each of the land portions 241 of the circuit substrate 24 at the radial outer side of the inner bottom portion 212.

Each of the lead wires 421 led out toward the lower surface of the inner bottom portion 212 in this manner is accommodated within the base groove portion 52. The axial depth of the base groove portion 52 is preferably larger than the sum of the thickness of the insulating portion 28, the thickness of the first insulating sheet portion 25 and the diameter of each of the lead wires 421. Thus, each of the lead wires 421 is prevented from protruding axially below the lower surface of the inner bottom portion 212. As a result, the total axial thickness of the spindle motor 11 is reduced. The diameter of each of the lead wires 421 mentioned above denotes the diameter of a cross section including both a bare conductor of each of the lead wires 421 and a protection film covering the bare conductor.

The first insulating sheet portion 25 is interposed between the lead wires 421 and the base groove portion 52. The second insulating sheet portion 26 is interposed between the inner bottom portion 212 and the lead wires 421. This prevents the base member 21 and the lead wires 421 from contacting each other. Thus, the base member 21 and the lead wires 421 are electrically insulated from each other. Particularly, in the present preferred embodiment, when seen in a plan view, a portion of the first insulating sheet portion 25 overlaps with the radial outer end portion of the lower opening of the base through-hole 51. Moreover, when seen in a plan view, a portion of the second insulating sheet portion 26 overlaps with the radial inner end portion of the upper opening of the base through-hole 51. This prevents the base member 21 and the lead wires 421 from contacting each other.

In the present preferred embodiment, as shown in FIG. 5, the first insulating sheet portion 25 is preferably interposed between the radial outer lower corner portion 511 of the tubular surface 510 defining the base through-hole 51 and each of the lead wires 421. For that reason, each of the lead wires 421 does not make contact with the lower corner portion 511 or the insulating portion 28 covering the lower corner portion 511. Moreover, the second insulating sheet portion 26 is interposed between the radial inner upper corner portion 512 of the tubular surface 510 defining the base through-hole 51 and each of the lead wires 421. For that reason, each of the lead wires 421 does not contact the upper corner portion 512 or the insulating portion 28 covering the upper corner portion 512. Thus, stresses are prevented from concentrating on the lead wires 421. As a result, the lead wires 421 are prevented or substantially prevented from getting damaged.

Each of the lead wires 421 led out from the coils 42 includes a bare conductor and a protection film (not shown) covering the bare conductor. The protection film is made of an electrically insulating material. The protection film is easily damaged when contacting a rigid material such as, for example, metal or the like. In the present preferred embodiment, the lead wires 421 contact the first insulating sheet portion 25 and the second insulating sheet portion 26 which are lower in rigidity than the metal of which the base member 21 is made. Thus, the protection film is preferably prevented from getting damaged. Even if the protection film of each of the lead wires 421 becomes damaged, there is preferably no possibility that the lead wires 421 and the base member 21 contact each other. In particular, the first insulating sheet portion 25 and the second insulating sheet portion 26 are made of an insulating material. This prevents electric conduction between the lead wires 421 and the base member 21.

As shown in FIG. 6, the base through-hole 51 preferably has a diameter which becomes different depending on the direction in which it extends. The base through-hole 51 includes a major axis J1 extending in a direction in which the diameter of the base through-hole 51 becomes largest and a minor axis J2 extending in a direction in which the diameter of the base through-hole 51 becomes smallest. A portion of an edge of the first insulating sheet portion 25 is arranged on the lower surface of the base member 21 to intersect the major axis J1 of the base through-hole 51 and to cover a portion of the base through-hole 51. This makes it easy to lead out the lead wires 421 while maintaining the rigidity of the base member 21.

Preferably, the base through-hole 51 has an oval shape, a rectangular shape, an elongated elliptical shape, a rectangular shape with rounded corners, for example.

In the present preferred embodiment, the major axis J1 of the base through-hole 51 is preferably parallel to the radial direction. However, the present invention is not limited thereto. For example, the major axis J1 of the base through-hole 51 may intersect the radial direction. In the below-mentioned preferred embodiment, for the purpose of convenience, description will be made under the assumption that the major axis extends in the radial direction.

As shown in FIG. 6, the base through-hole 51 is preferably arranged within the base groove portion 52.

In the present preferred embodiment, as shown in FIGS. 4 and 5, the radial inner end portion of the first insulating sheet portion 25 is positioned radially inward of the radial outer lower corner portion 511 of the tubular surface 510 defining the base through-hole 51. The radial inner end portion of the first insulating sheet portion 25 is preferably positioned near the lower corner portion 511. Moreover, the radial inner end portion of the first insulating sheet portion 25 is positioned radially outward of the radial inner end portion of the tubular surface 510. The radial inner end portion of the first insulating sheet portion 25 is arranged in such a position as to axially overlap with the base through-hole 51. In other words, the radial inner end portion of the first insulating sheet portion 25 is preferably positioned within the base through-hole 51. The lead wires 421 contact the radial inner end portion of the first insulating sheet portion 25. Thus, the first insulating sheet portion 25 is bent upward at the radial inner side of the lower corner portion 511. This reduces the force generated between the first insulating sheet portion 25 and the lead wires 421. As a result, the lead wires 421 are further prevented from getting damaged.

Similarly, the end portion of the second insulating sheet portion 26 existing within the base through-hole 51 is positioned radially outward of the radial inner upper corner portion 512 of the tubular surface 510. This end portion of the second insulating sheet portion 26 is positioned near the upper corner portion 512. This end portion of the second insulating sheet portion 26 is bent downward by contacting the lead wires 421. This reduces the force generated between the second insulating sheet portion 26 and the lead wires 421. As a result, the lead wires 421 are preferably further prevented from getting damaged.

In the present preferred embodiment, the lead wires 421 extend from the coils 42 to the land portions 241 with little or no slackness. In other words, tension is exerted on the lead wires 421. This tension prevents the lead wires 421 from protruding downward away from the base groove portion 52. However, when tension is exerted on the lead wires 421, the protection films covering the surfaces of the lead wires 421 are apt to be damaged. In the present preferred embodiment, however, the external forces applied to the lead wires 421 are reduced by the first insulating sheet portion 25 and the second insulating sheet portion 26. As a result, the lead wires 421 are prevented from getting damaged.

In the present preferred embodiment, the first insulating sheet portion 25 and the circuit substrate 24 are preferably defined by different members. The radial outer end portions of the first insulating sheet portion 25 is positioned radially inward of the radial inner end portion of the circuit substrate 24. The lower surface of the annular wall portion 213 is preferably positioned between the radial outer end portion of the first insulating sheet portion 25 and the radial inner end portion of circuit substrate 24. That is to say, in the present preferred embodiment, the first insulating sheet portion 25 is not arranged on the lower surface of the ring-shaped wall portion 213 as a slant surface or a step surface. This makes it possible to prevent the first insulating sheet portion 25 from being separated downward from the base member 21.

In the present preferred embodiment, as shown in FIGS. 4 through 6, the radial inner end portion of the first insulating sheet portion 25 is positioned radially outward of the radial inner end portion of the tubular surface 510 defining the base through-hole 51. Furthermore, the axial thickness of the base member 21 at the radial inner side of the base groove portion 52 and the base through-hole 51 is larger than the axial thickness of the base member 21 in the base groove portion 52. This makes it possible to increase the rigidity of the base member 21 at the radial inner side of the base through-hole 51.

As shown in FIG. 6, the circumferential width of the first insulating sheet portion 25 in the region where the first insulating sheet portion 25 overlaps with the base through-hole is preferably larger than the minor-axis-direction maximum width of the base through-hole 51. This makes it possible to increase the area over which the first insulating sheet portion overlaps with the base through-hole 51. Preferably, the circumferential width of the first insulating sheet portion 25 is smaller than the circumferential width of the base groove portion 52. This ensures that the first insulating sheet portion 25 is accommodated within the base groove portion 52. Accordingly, it is possible to reduce the axial thickness of the base member 21.

The base groove portion 52 preferably includes wall surfaces 521. Preferably, the first insulating sheet portion 25 contacts the wall surfaces 521 of the base groove portion 52. This makes it easy to decide the major-axis-direction position of the first insulating sheet portion 25. The minor-axis-direction maximum width of the base through-hole 51 is preferably larger than the distance from the outer edge of the base through-hole 51 to the outer edge of the base groove portion 52 in the circumferential direction.

In the present preferred embodiment, as shown in FIG. 6, three lead wires 421 preferably extend in a substantially radial pattern from the lower end portion of the base through-hole 51. The circumferential width of each of the base groove portion 52 and the first insulating sheet portion 25 is widened radially outward step by step. This prevents the lead wires 421 and the base groove portion 52 from contacting each other.

In FIG. 6, imaginary lines 522 are indicated by double-dot chain lines. The imaginary lines 522 are drawn by extending the opposite wall surfaces 521 of the base groove portion 52 radially outward from the radial outer end portion of the base groove portion 52. In the present preferred embodiment, the centers of the respective land portions 241 are preferably positioned between the imaginary lines 522. This arrangement makes it possible to prevent the lead wires 421 extending toward the respective land portions 241 from contacting the wall surfaces 521 of the base groove portion 52.

As shown in FIG. 6, each of the land portions 241 of the present preferred embodiment is preferably has an elliptical or substantially elliptical shape having a major axis and a minor axis when seen in a plan view. The major axes of the respective land portions 241 are arranged to extend along the substantially radial lines passing through the center of the base through-hole 51. This makes it possible to extend the length of the lead wires 421 overlapping with the respective land portions 241. For that reason, it becomes easy to solder the lead wires 421 to the respective land portions 241.

Within the base through-hole 51, the lead wires 421 are preferably arranged side by side along the minor axis direction without radially overlapping with one another. Thus, the lead wires 421 are not entangled with one another and can be soldered to the respective land portions 241 with ease. The sum of diameters of the lead wires 421 is smaller than the maximum value of the minor-axis-direction width of the base through-hole 51. This makes it easy to lead out the lead wires 421 from the base through-hole 51.

As shown in FIGS. 4 and 5, the stationary unit 2 of the present preferred embodiment preferably further includes, for example, an adhesive agent 29 as a sealing material. The base through-hole 51 is sealed by the adhesive agent 29. This prevents gas from flowing through the base through-hole 51. As a result, it is possible to enhance the air-tightness of the disk drive apparatus 1. In addition, the lead wires 421 are preferably fixed by the adhesive agent 29. As a result, the lead wires 421 are prevented from protruding axially below the lower surface of the inner bottom portion 212.

In the present preferred embodiment, the adhesive agent 29 is arranged not only within the base through-hole 51 but also within the base groove portion 52. This makes it possible to fix the lead wires 421 with the adhesive agent 29 over a broader range. For that reason, the lead wires 421 are prevented from protruding axially below the lower surface of the inner bottom portion 212. Preferably, the base groove portion 52 is arranged to extend radially inward of the base through-hole 51. Referring to FIG. 6, it is preferred that the base groove portion 52 be arranged to extend radially inward of the base through-hole 51 along the major axis direction. This arrangement ensures that the adhesive agent 29 will be spread to the edge of the base through-hole 51. Accordingly, it is possible to reliably seal the base through-hole 51.

In the present preferred embodiment, the axial depth of the base groove portion 52 is preferably larger than the sum of the thickness of the insulating portion 28, the thickness of the first insulating sheet portion 25, the diameter of each of the lead wires 421, and the thickness of the adhesive agent 29. Thus, the adhesive agent 29 is prevented from extruding downward from the base groove portion 52.

Other sealing materials may be used in place of the adhesive agent 29 if so desired. For example, a resin material other than the adhesive agent may be used as a sealing material.

While illustrative preferred embodiments of the present invention have been described above, the present invention is not limited to the aforementioned preferred embodiments.

Figure 7:
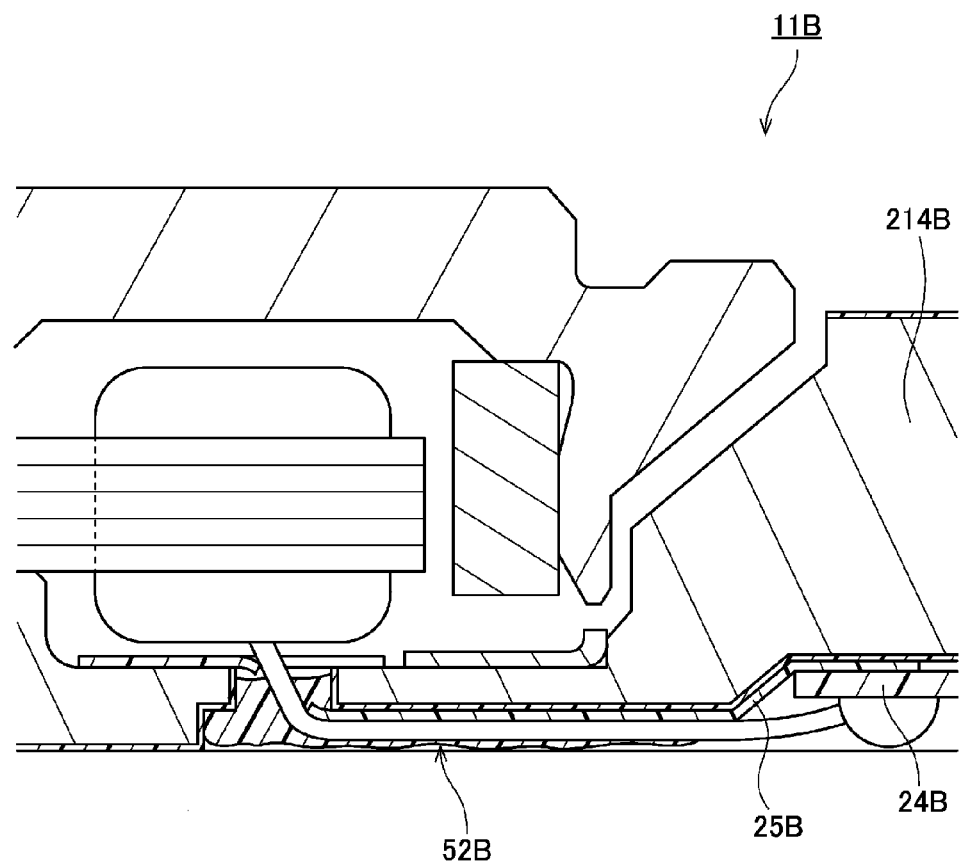
FIG. 7 is a partial section view of a spindle motor according to one modified example of a preferred embodiment of the present invention.

FIG. 7 is a partial vertical sectional view of a spindle motor 11B according to one modified example of a preferred embodiment of the present invention. In the example shown in FIG. 7, the first insulating sheet portion 25B extends to the lower surface of the outer bottom portion 214B within the base groove portion 52B. A portion of the radial outer region of the first insulating sheet portion 25B is covered with the circuit substrate 24B. As a result, a portion of the lower surface of the first insulating sheet portion 25B contacts a portion of the upper surface of the circuit substrate 24B. Thus, by use of the circuit substrate 24B which is preferably thicker than the first insulating sheet portion 25B, it is possible to prevent the first insulating sheet portion 25B from being separated downward from the base member.

Figure 8:
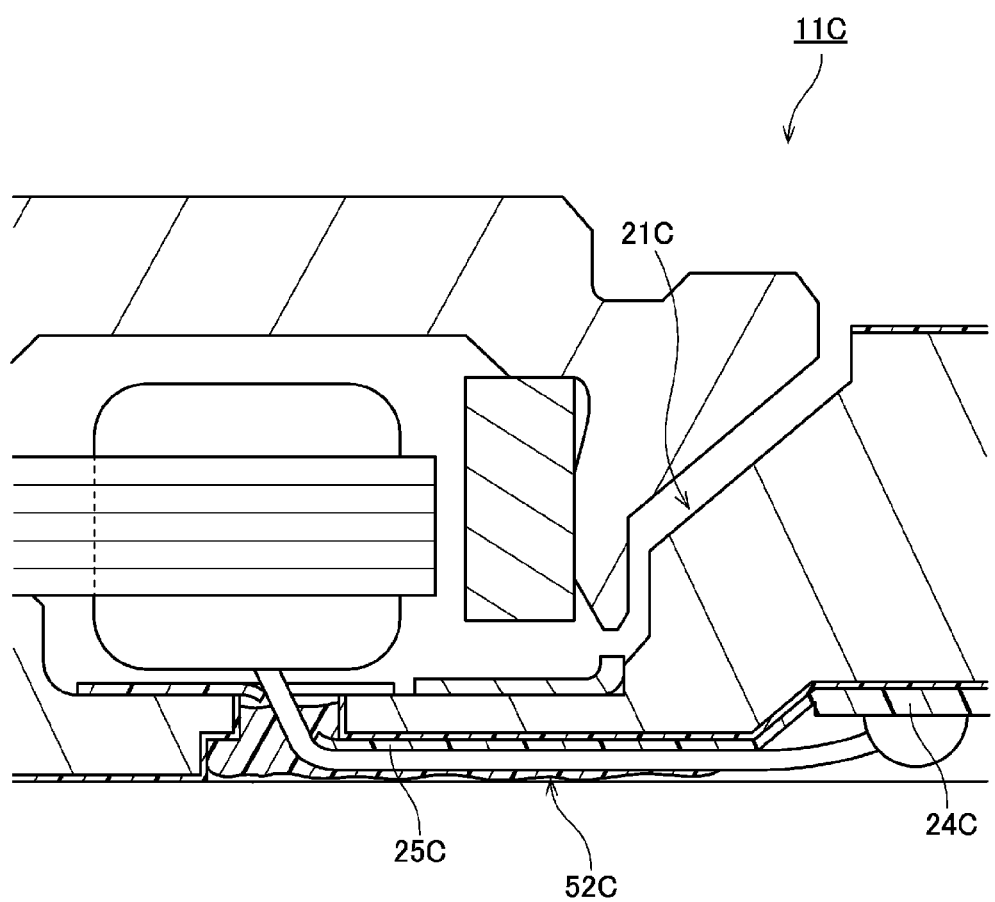
FIG. 8 is a partial section view of a spindle motor according to another modified example of a preferred embodiment of the present invention.

FIG. 8 is a partial vertical sectional view of a spindle motor 11C according to another modified example of a preferred embodiment of the present invention. In the example shown in FIG. 8, a portion of the circuit substrate 24C extends into the base groove portion 52C and defines a first insulating sheet portion 25C. This makes it possible to provide the circuit substrate 24C and the first insulating sheet portion 25C as a single monolithic member. For that reason, it is possible to reduce the number of steps for attaching the circuit substrate 24C and the first insulating sheet portion 25C to the base member 21C.

While the thickness of the insulating sheet portions is preferably set to be smaller than the thickness of the circuit substrate in the respective preferred embodiments described above, the present invention is not limited thereto. The thickness of the insulating sheet portions may be equal or substantially equal to the thickness of the circuit substrate.

While the insulating portion is provided between the first insulating sheet portion and the inner bottom portion of the base member in the second preferred embodiment, the present invention is not limited thereto. For example, the insulating portion may be omitted as long as the contact between the lead wires and the base member can be prevented by the first insulating sheet portion.

Furthermore, the circuit substrate may extend to the lower surface of the annular wall portion. The land portions may be arranged in the portion of the circuit substrate positioned on the lower surface of the annular wall portion. The lead wires may be soldered to the land portions.

Moreover, the circuit substrate may not necessarily be the flexible printed substrate. The circuit substrate may be, e.g., a rigid substrate such as, for example, a connector or the like.

The spindle motor of the present embodiment can be applied to different kinds of disk drive apparatuses. The disk drive apparatus may be the one that rotates a disk other than the magnetic disk, e.g., an optical disk. According to the present invention, it is possible to make the disk drive apparatus thinner in the axial direction. Accordingly, the present invention is particularly useful in a spindle motor employed in a disk drive apparatus for a thin notebook-type PC or a tablet-type PC.

In the aforementioned preferred embodiments of the present invention and modifications thereof, description has been made on a so-called shaft rotating type motor in which a sleeve belongs to a stationary unit with a shaft belonging to a rotary unit. However, the motor of the present invention may alternatively be a so-called shaft fixing type motor in which a shaft belongs to a stationary unit with a sleeve belonging to a rotary unit.

The preferred embodiments of the present invention and modifications thereof can find its application in a spindle motor and a disk drive apparatus.

Features of the above-described preferred embodiments and the modifications thereof may be combined appropriately as long as no conflict arises.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor, comprising:
   a stationary unit; and
   a rotary unit supported to rotate about a center axis extending in an up-and-down direction; wherein
   the stationary unit includes a base member, an armature positioned above the base member, and a circuit substrate arranged on a lower surface of the base member and electrically connected to a coil of the armature;
   the rotary unit includes a magnet arranged in an opposing relationship with the armature;
   the base member includes a base groove portion arranged on the lower surface of the base member, at least one base through-hole extending through the base member from an upper surface of the base member toward the lower surface of the base member, and a first insulating sheet portion arranged on a bottom surface of the base groove portion;
   a lead wire extending from the coil is led out into the base groove portion through the base through-hole and connected to a land portion of the circuit substrate; and
   the base through-hole has a diameter which is different depending on the direction in which it extends, the base through-hole includes a major axis extending in a direction in which the diameter of the base through-hole becomes largest and a minor axis extending in a direction in which the diameter of the base through-hole becomes smallest, and the base through-hole includes a portion of an edge of the first insulating sheet portion arranged on the lower surface of the base member to intersect the major axis of the base through-hole and to cover a portion of the base through-hole.

2. The spindle motor of claim 1, wherein the base groove portion is arranged to extend radially inward of the base through-hole along a major axis direction.

3. The spindle motor of claim 1, wherein a minor-axis-direction width of the first insulating sheet portion in a region where the first insulating sheet portion overlaps with the base through-hole is larger than a minor-axis-direction maximum width of the base through-hole.

4. The spindle motor of claim 1, wherein the first insulating sheet portion has a minor-axis-direction width smaller than a minor-axis-direction width of the base groove portion.

5. The spindle motor of claim 1, wherein a minor-axis-direction maximum width of the base through-hole is larger than a distance from an outer edge of the base through-hole to an outer edge of the base groove portion.

6. The spindle motor of claim 1, wherein the base groove portion further includes wall surfaces, and the first insulating sheet portion contacts the wall surfaces of the base groove portion.

7. The spindle motor of claim 1, wherein the first insulating sheet portion and the circuit substrate are defined by different members.

8. The spindle motor of claim 1, wherein the first insulating sheet portion is a portion of the circuit substrate.

9. The spindle motor of claim 1, wherein the first insulating sheet portion has a thickness smaller than a thickness of the circuit substrate in the land portion.

10. The spindle motor of claim 1, wherein the lead wire includes a plurality of lead wires not radially overlapping with one another within the base through-hole.

11. The spindle motor of claim 10, wherein a sum of diameters of the lead wires is smaller than a maximum value of a minor-axis-direction width of the base through-hole.

12. The spindle motor of claim 1, wherein the base through-hole includes a plurality of base through-holes.

13. The spindle motor of claim 1, wherein the stationary unit further includes a second insulating sheet portion arranged on the upper surface of the base member, the second insulating sheet portion having a thickness smaller than a thickness of the circuit substrate in the land portion, and a portion of the second insulating sheet portion intersecting the major axis of the base through-hole when seen in a plan view and covering a portion of the base through-hole.

14. A disk drive apparatus, comprising:
   the spindle motor of claim 1;
   an access unit arranged to perform at least one of information reading and writing tasks with respect to a disk supported on the rotary unit of the spindle motor; and
   a housing arranged to accommodate the spindle motor and the access unit.

15. The spindle motor of claim 1, wherein the base member is made of metal.

* * * * *